United States Patent
Bharadwaj et al.

(10) Patent No.: US 6,605,912 B1
(45) Date of Patent: *Aug. 12, 2003

(54) METHOD FOR CONTROLLING A PERMANENT MAGNET MOTOR

(75) Inventors: Aravind Sourirajan Bharadwaj, Canton, MI (US); Fang Deng, Troy, MI (US); Thomas Wolfgang Nehl, Shelby Township, Macomb County, MI (US); Malakondaiah Naidu, Troy, MI (US)

(73) Assignee: Delphi Technologies, Inc., Troy, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,488

(22) Filed: Jun. 25, 1998

(51) Int. Cl.[7] .................................. H02P 7/50
(52) U.S. Cl. ................ 318/439; 318/138; 318/254; 318/700; 318/720; 318/721; 318/722; 318/723; 318/724
(58) Field of Search ................ 318/439, 254, 318/138, 700, 685, 696, 720–724, 432

(56) References Cited

U.S. PATENT DOCUMENTS

| | | | | |
|---|---|---|---|---|
| 4,321,518 A | * | 3/1982 | Akamatsu | 318/696 |
| 4,444,285 A | | 4/1984 | Stewart et al. | 180/65.4 |
| 4,454,458 A | * | 6/1984 | Holland | 318/254 |
| 4,490,661 A | * | 12/1984 | Brown et al. | 318/661 |
| 4,651,066 A | | 3/1987 | Gritter et al. | 318/139 |
| 4,651,069 A | | 3/1987 | Pellegrini | 318/254 |
| 4,707,650 A | * | 11/1987 | Bose | 318/685 |
| 4,720,663 A | | 1/1988 | Welch et al. | 318/341 |
| 4,835,448 A | | 5/1989 | Dishner et al. | 318/254 |
| 4,926,099 A | | 5/1990 | Ricker et al. | 318/254 |
| 4,926,104 A | * | 5/1990 | King et al. | 318/599 |
| 5,029,263 A | * | 7/1991 | Rozman | 318/714 |
| 5,034,668 A | * | 7/1991 | Bausch | 318/254 |
| 5,420,492 A | * | 5/1995 | Sood et al. | 318/809 |
| 5,549,172 A | | 8/1996 | Mutoh et al. | 180/65.1 |
| 5,569,995 A | | 10/1996 | Kusaka et al. | 318/717 |
| 5,583,411 A | | 12/1996 | Kusano et al. | 318/719 |
| 5,677,605 A | * | 10/1997 | Cambier et al. | 318/254 |
| 5,739,664 A | * | 4/1998 | Deng et al. | 318/808 |
| 5,777,447 A | * | 7/1998 | Okano | 318/434 |

* cited by examiner

Primary Examiner—Robert E. Nappi
Assistant Examiner—Tyrone Smith
(74) Attorney, Agent, or Firm—Vincent A. Cichosz (57) ABSTRACT

A three region control strategy for a permanent magnet motor is presented. In a first control region, the permanent magnet motor is operated at, a 120° conduction square wave mode at reduced phase current, and below a no-load speed. The motor phase current commutation causes eddy current losses in the rotor magnets and core which are insignificant due to the low phase currents and relatively low rotor speed. Meanwhile, the inverter switching losses are kept low as two switches are in use (on/off) for each current commutation during the 120° conduction mode. In a second control region, the permanent magnet motor is operated at a 180° conduction sinusoidal wave mode with high phase currents. The 180° conduction sinusoidal wave mode minimizes the commutation loss. In a third control region, the permanent magnet motor is operated above its no-load speed or in a field weakening mode. At these higher speeds the slot ripple and commutation losses on the rotor increase, and the demagnetizing component of the armature reaction increases due to field weakening. Commutation losses are minimized through sinusoidal current operation. In the field weakening mode, the phase current conduction angle is set to 180° and the phase currents become sinusoidal.

37 Claims, 11 Drawing Sheets

METHOD FOR CONTROLLING A PERMANENT MAGNET MOTOR

TECHNICAL FIELD

The present invention relates to a method and system for controlling permanent magnet motors. More specifically, the present invention relates to a method and system for controlling permanent magnet motors utilizing a three region control strategy.

BACKGROUND OF THE INVENTION

Drive systems for electric vehicles seek to provide high peak power for passing and acceleration, and high efficiency at light loads and highway cruising to provide acceptable range, all at a reasonable cost. Permanent magnet (PM) motors (drives) have been considered for electric and hybrid vehicle drive systems due to their high performance and efficiency, flexibility, and low noise and torque ripple. In a permanent magnet motor, a rotary field is established by a set of permanent magnets secured to the rotor and a second rotary field is established by sequentially energizing a set of phase windings secured on the stator. Motor torque results when these fields are rotating synchronously and out of phase. Torque is maximum when these fields are in quadrature and zero when they are coincident (in phase). A position or emf sensing device detects the position of the rotor and a logic circuit energizes the stator windings relative to the detected position of the rotor to accelerate the rotor. The motor phase windings are energized as dictated by a control strategy to control the motor. Typically, in order for vehicles powered by PM motors to attain highway speeds, the PM motors have a reduced number of turns. This follows as the induced voltage in the PM motor is a linear function of speed. Other approaches to increase (or extend) the speed range have been to increase the supply voltage to the PM motor or to utilize the PM motor reactance to drop the excess voltage.

SUMMARY OF THE INVENTION

It is, therefore, a primary object of the present invention to provide a method for efficiently controlling permanent magnet motors in electric and hybrid vehicles. It is further an object of the invention to maximize drive efficiency during the Federal Testing Procedures (FTP) driving cycle where the drive operation is primarily at low speeds and light loads, provide necessary peak power for acceleration without demagnetizing the rotor due to eddy current heating, and provide for field weakening to extend the speed range to reduce the inverter cost.

In accordance with these and other objects the present invention utilizes a three region control strategy. In a first region, the permanent magnet motor (i.e., a permanent magnet brushless d.c. motor having a trapezoidal distribution of magnet field in its airgap) is operated at, a 120° conduction rectangular wave mode at reduced phase currents, and below the no-load speed. The motor phase current commutation causes eddy current losses in the rotor magnets and core which are insignificant due to the low phase currents and relatively low rotor speed. Meanwhile, the inverter switching losses are kept low as two switches are in use (on/off) for each current commutation during the 120° conduction mode. In a second region, the permanent magnet (PM) motor is operated at a 180° conduction sinusoidal wave mode with high phase currents. The 180° conduction sinusoidal wave mode minimizes the commutation loss in the rotor. In a third region, the PM motor is operated above its no-load speed or in a field weakening mode. At these higher speeds the slot ripple and commutation losses on the rotor increase, and the demagnetizing component of the armature reaction increases due to field weakening. Commutation losses are minimized (or eliminated) through sinusoidal current operation. In the field weakening mode, the phase current conduction angle is set to 180° and the phase currents become sinusoidal.

The above-discussed and other features and advantages of the present invention will be appreciated and understood by those skilled in the art from the following detailed description and drawings.

BRIEF DESCRIPTION OF THE DRAWINGS

The present invention will now be described, by way of example only, with reference to the accompanying drawings in which:

FIGS. 17A and B are phasor diagrams for the permanent magnet motor of the present invention with FIG. 17A being a phasor diagram without flux weakening and FIG. 17B being a phasor diagram with flux weakening;

DETAILED DESCRIPTION OF THE INVENTION

Figure 1:
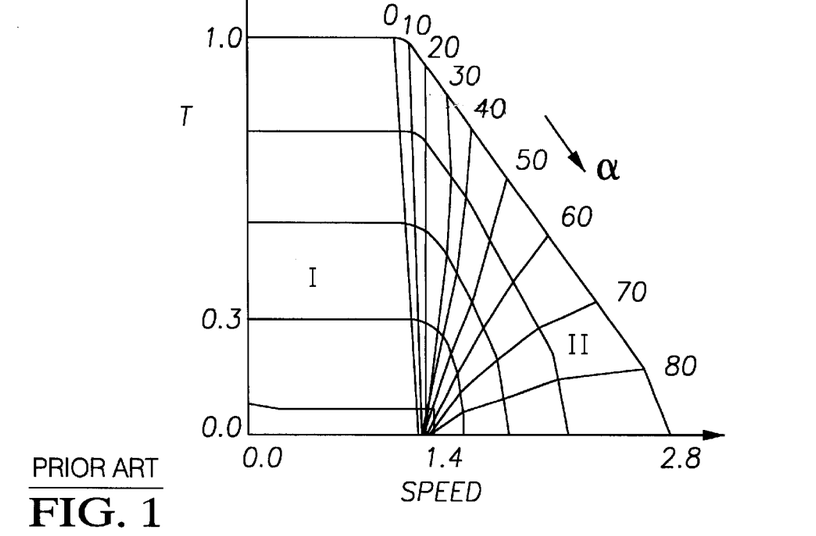
FIG. 1 is a plot of torque versus speed for a permanent magnet motor utilizing a two region control strategy in accordance with the prior art.
Figure 2:
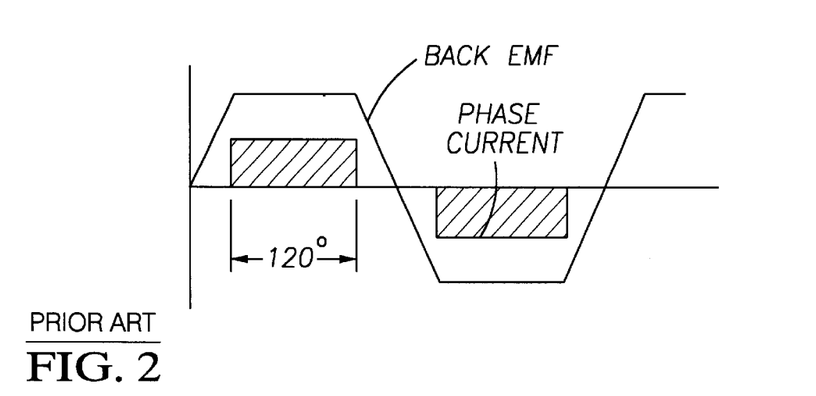
FIG. 2 is a plot of phase current in relation to back emf of the permanent magnet motor in the first region of control of the two region control strategy of the prior art.
Figure 3:
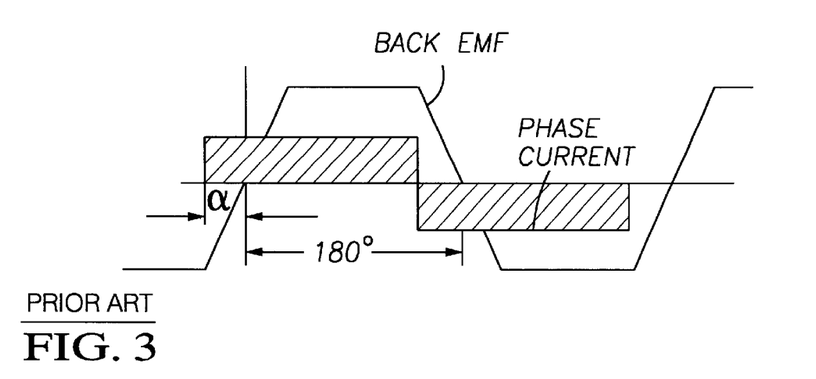
FIG. 3 is a plot of phase current in relation to back emf of the permanent magnet motor in the second region of control of the two region control strategy of the prior art.

Referring to FIGS. 1–3, labeled prior art, a two region control strategy is shown. FIG. 1 is a plot of torque as a function of speed with control regions I and II being identified. In the first control region high torque is provided up to the no-load speed. In the second control region reduced torque is available above the no-load speed thereby extending the speed operating range of the motor. In the first control region, FIG. 2, the permanent magnet motor is operated at a 120° conduction rectangular wave mode with high phase currents, and below the no-load speed. These phase currents are in phase (i.e., the phase advance angle $\alpha=0$) with the trapezoidal back emf of the motor. The motor phase current commutation causes eddy current losses in the rotor magnets and core. Meanwhile, the inverter switching losses are low as two switches are in use (on/off) for each current commutation during the 120° conduction mode. In the second control region, FIG. 3, the PM motor is operated above its no-load speed or in a field weakening mode. At these higher speeds the slot ripple and commutation losses on the rotor increase, and the demagnetizing component of the armature reaction increases due to field weakening. In the field weakening mode the phase current conduction angle is naturally over 120° and gradually changes to 180°. These phase currents are advanced (i.e., the phase advance angle $\alpha \neq 0$) relative to the trapezoidal back emf of the motor.

Figure 4:
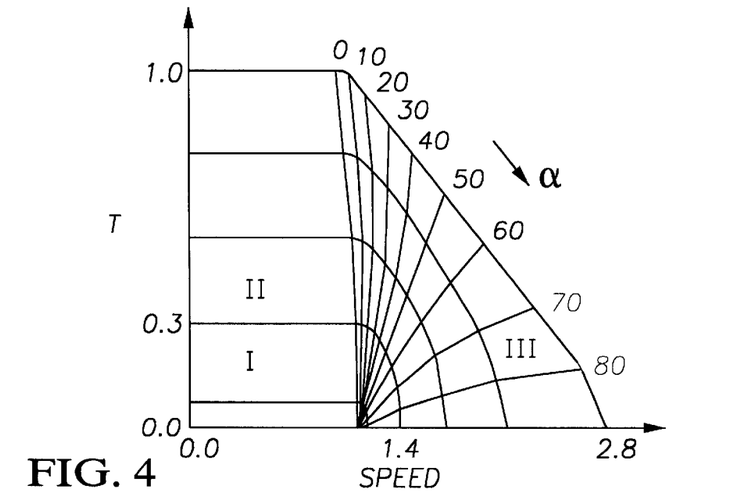
FIG. 4 is a plot of torque versus speed for a permanent magnet motor utilizing a three region control strategy in accordance with the present invention.

Referring to FIGS. 4–7, in accordance with the present invention a three region control strategy is shown for use in electric vehicles (not shown). FIG. 4 is a plot of torque as a function of speed with control regions I, II and III being identified. In the first control region, low torque up to the no-load speed is provided for high efficiency operation, thereby allowing vehicles utilizing the present invention to satisfy the Federal Testing Procedures (FTP) driving cycle where the drive operation is primarily at low speeds and light loads. In the second control region, high torque up to the no-load speed is provided, such is required for acceleration of a vehicle. In the third control region, reduced torque is available above the no-load speed thereby extending the speed operations range of the motor, such as is required during highway use of a vehicle.

Figure 5:
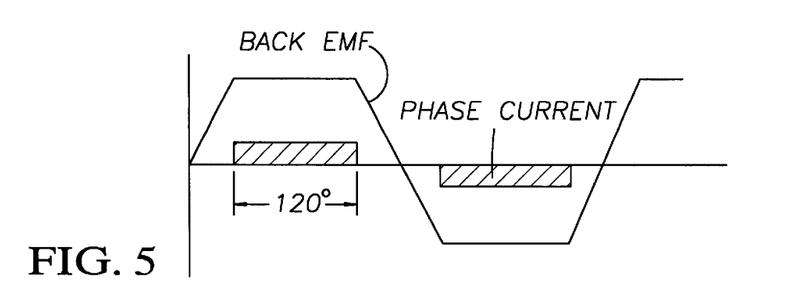
FIG. 5 is a plot of phase current in relation to back emf of the permanent magnet motor in the first region of control of the three region control strategy of the present invention.

In the first control region (mode of operation), FIG. 5, the permanent magnet motor (i.e., a permanent magnet brushless d.c. motor having a trapezoidal distribution of magnet field in its airgap) is operated at, a 120° conduction rectangular wave mode at reduced phase currents, and below the no-load speed. The reduced phase current below the no-load speed is an important feature of the present invention. These phase currents are in phase (i.e., the phase advance angle, $\alpha=0$) with the trapezoidal back emf of the motor. The motor phase current commutation causes eddy current losses in the rotor magnets and core which are insignificant due to the low phase currents and relatively low rotor speed. Meanwhile, the inverter switching losses are kept low as two switches are in use (on/off) for each current commutation during the 120° conduction mode. In the second control region (mode of operation), FIG. 6, the permanent magnet (PM) motor is operated at a 180° conduction sinusoidal wave mode with high phase currents. The 180° conduction sinusoidal wave mode minimizes the commutation loss and is an important feature of the present invention. These sinusoidal phase currents are in phase (i.e., the phase advance angle, $\alpha \neq 0$) with the trapezoidal back emf of the motor. In the third control region (mode of operation), FIG. 7, the PM motor is operated above its no-load speed or in a field weakening mode. At these higher speeds the slot ripple and commutation losses on the rotor increase, and the demagnetizing component of the armature reaction increases due to field weakening. Commutation losses are minimized (or eliminated) through sinusoidal current operation. In the field weakening mode, the phase current conduction angle is set to 180° and the phase currents become sinusoidal. These sinusoidal phase currents are advanced (i.e., the phase advance angle, $\alpha>0$) relative to the trapezoidal back emf of the motor.

Figure 8:
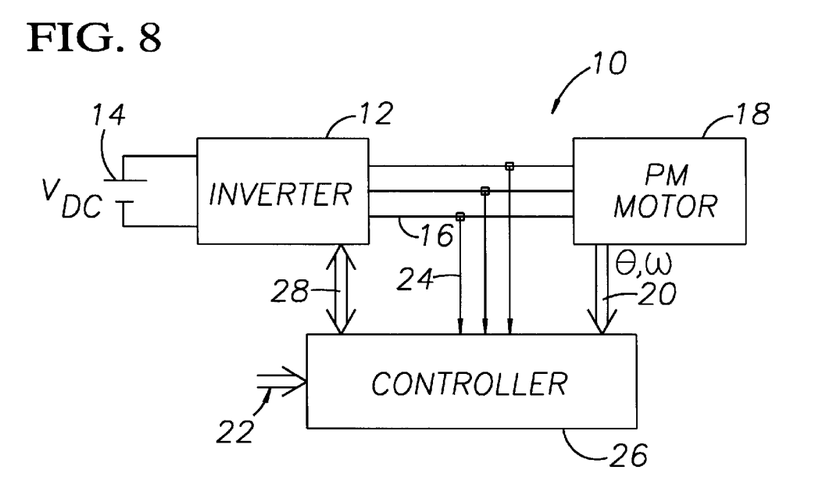
FIG. 8 is a schematic block diagram of a control system for a permanent magnet motor utilizing the three region control strategy of the present invention.

Referring to FIG. 8, a functional block diagram of a permanent magnet (PM) motor drive system of the present invention is generally shown at 10. The PM motor drive system 10 comprises a three phase inverter 12 receptive to a voltage $V_{DC}$ from a source (battery) 14 to provide three phase a.c. signals at lines 16 for driving a PM motor 18. The inverter 12 modulates the input d.c. voltage to form the three phase a.c. voltages such that the phase currents are in the proper phase with their respective back (or reverse) emfs (electromotive force) to produce the desired torque. The PM motor 14 preferably comprises a permanent magnet brushless d.c. motor having a trapezoidal distribution of the magnetic field in its airgap. Sensed motor signals (motor rotor position $\theta$ and motor rotor speed $\omega$) at line 20, drive control signal (generated in response to an operator input such as an accelerator pedal position of an electric vehicle) at line 22 and current sensed signals ($i_a$, $i_b$, $i_c$ or $i_a$, $i_b$ since $i_c=-i_a-i_b$) at lines 24 are presented to a controller 26 (e.g., a digital signal processor, having associated memory, programmed in accordance with the control process of the present invention). The controller 22 comprises a 120°/180° mode digital signal processor controller portion and a commutation and position detection logic portion. Communication signals (H1–H6) at line 28 are provided by the controller 26 to control the motor 18, in accordance with a control scheme of the present invention, described hereinabove.

Figure 9:
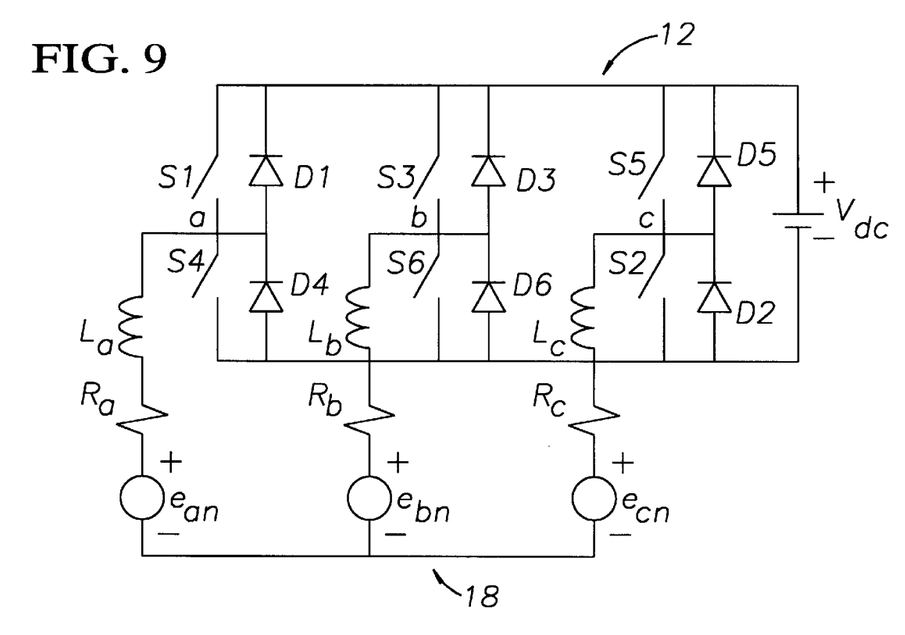
FIG. 9 is a schematic diagram of an inverter circuit and an equivalent circuit of the permanent magnet motor of the control system of FIG. 8.

Referring to FIG. 9, the inverter 12 is shown by an equivalent circuit representation of the PM motor 18 connected to the inverter gate bipolar transistor (IGBT) full bridge inverter 12. Each phase of the PM motor 18 is represented by a series resistance ($R_a$, $R_b$, $R_c$), synchronous inductance ($L_a$, $L_b$, $L_c$) and its induced voltage ($e_{an}$, $e_{bn}$, $e_{cn}$). The inverter 12 has rectifiers D1–D6 with corresponding switches S1–S6, which are responsive to commutation signals H1–H6. Since the back emfs are trapezoidal with a 120E flat top, to obtain uniform torque the currents are injected in each phase during the 120E flat top portion of the back emf from inverter 12 in response to the commutation signals H1–H6.

Figure 10:
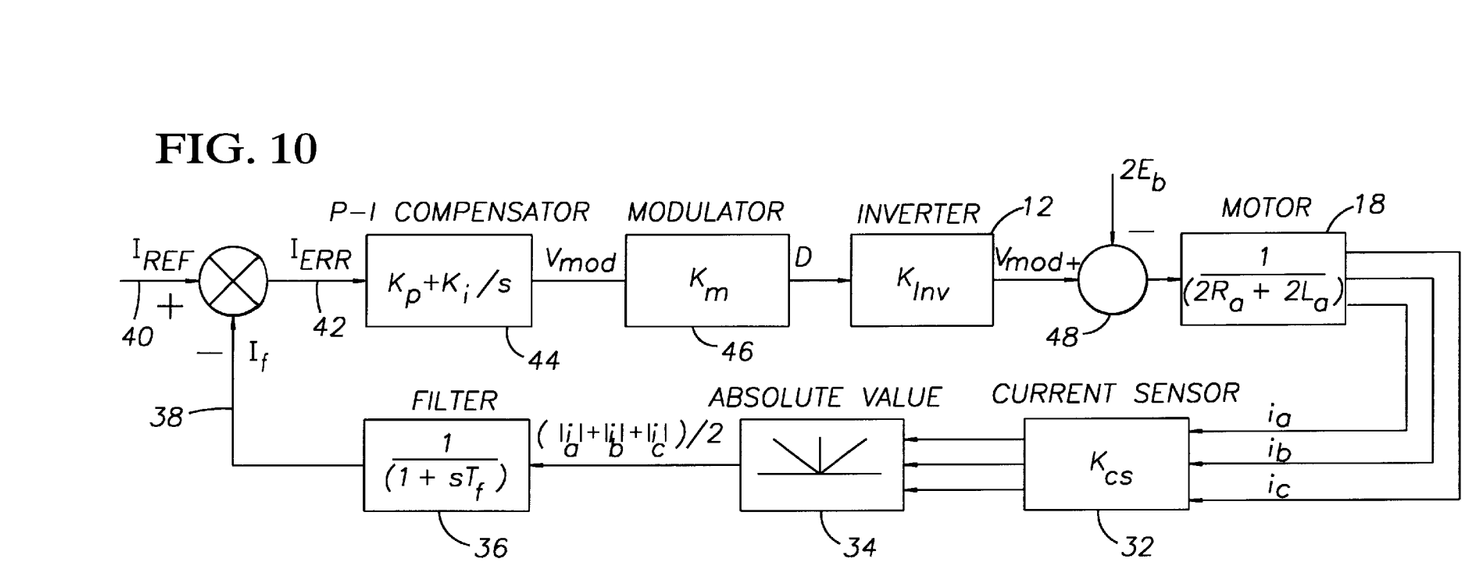
FIG. 10 is a schematic block diagram of the 120° mode current controller portion of the controller of FIG. 8 in accordance with a preferred embodiment of the present invention.

Referring to FIG. 10, a functional block diagram of the 120° mode current controller portion is shown. The three phase currents ($i_a$, $i_b$, $i_c$) are measured by hall effect current sensors 32 (having a gain $K_{cs}$) and passed through an absolute value circuit 34 for the respective phases. These outputs are added $((|I_a|+|I_b|+|I_c|)/2)$ and passed through a low pass filter and gain circuit $(1/(1+sT_f))$ 36 to obtain a current signal $(I_f)$ at line 38 proportional to the measured peak currents. It will be appreciated that with ideal commutation the summation of the absolute values of the three phase 120E quasi-square currents is a d.c. signal which is proportional to the phase current. The measured phase current signal $(I_f)$ is then compared with a reference current command $(I_{ref})$ at line 40 resulting in an error signal $(I_{err})$ at line 42. The error signal $(I_{err})$ is passed through a proportional and integral (P-I) controller $(K_p+K_i/s)$ 44. The output $(V_{mod})$ of the P-I controller 44 is compared with a fixed high frequency carrier signal $(K_m$, which is the reciprocal of the peak-peak value of the ramp signal of a pulse width modulator) in the pulse width modulator (PWM) 46 to generate PWM pulses (D) with variable duty cycle. The PWM signal (D), commutation signals H1–H6, and mode and direction signals are processed to provide the gate signals for the IGBTs S1–S6 of the inverter 12 ($k_{inv}$ is the inverter gain). The average voltage applied to the motor 18 is the product 48 of the inverter signal $(V_{inv})$ and the duty cycle.

Figure 11:
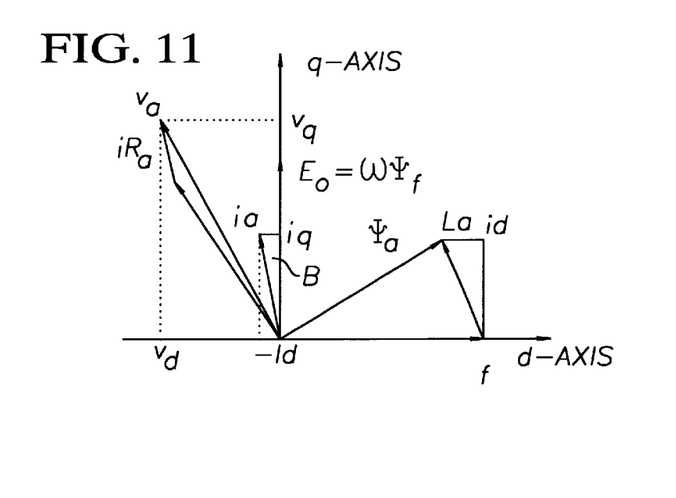
FIG. 11 is a steady state vector diagram on a d-q reference frame of the permanent magnet motor in accordance with the present invention.

The controller 26 switches from 120E to 180E current mode control when the motor stator current exceeds the preset value in order to reduce the rotor heating due to commutation losses (i.e., from region I to region II). Referring to FIG. 11, control is based on a d-q reference frame representation to facilitate operation of the motor 18 in the constant torque region as well as in the field weakening region without exceeding the maximum ratings of the inverter 12 and the motor 18. In the constant torque region, an $I_d=0$ rule (described hereinafter) is used to maximize torque per ampere, while in the field weakening region, where the back emf exceeds the inverter voltage, both the d and q axes currents are controlled as function of speed and load.

Figure 12:
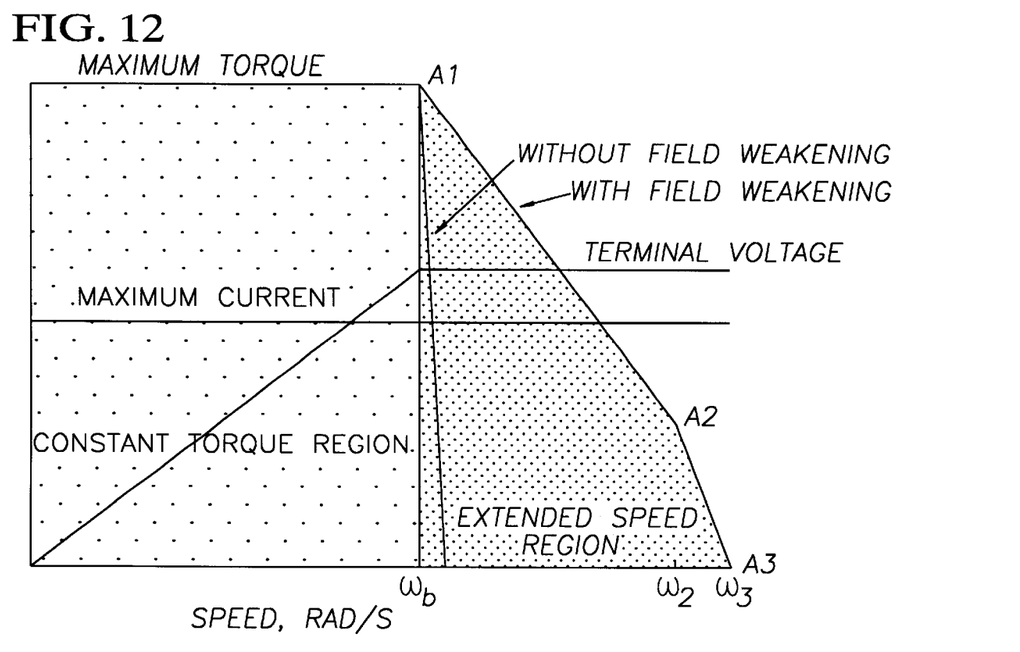
FIG. 12 is a plot of torque versus speed for the permanent magnet motor utilizing the three region control strategy of the present invention.

Referring to FIG. 12, typical torque-speed characteristics of the motor 18 is generally shown. The regions (I and II) up to the no-load speed ($T_b$), are constant torque regions while the region (III) above the no-load speed is an extension of the speed region accomplished by field weakening. In the constant torque regions, the input phase voltage of the motor 18 is increased linearly with speed up to the no-load value, where the voltage reaches its maximum value. The torque decreases sharply with increasing speed above base value, if $I_d=0$. Therefore, field weakening is used where both d and q axis currents are controlled to extend the speed range. The following operating constraints are applied:

$$Va=\sqrt{(Vd^2+Vq^2)} \leq Vm \qquad \text{Eq. 1,}$$

$$Ia=\sqrt{(Id^2+Iq^2)} \leq Im \qquad \text{Eq. 2,}$$

wherein $I_m$ is the maximum inverter phase current and $V_m$ is the maximum inverter output phase voltage.

Figure 13:
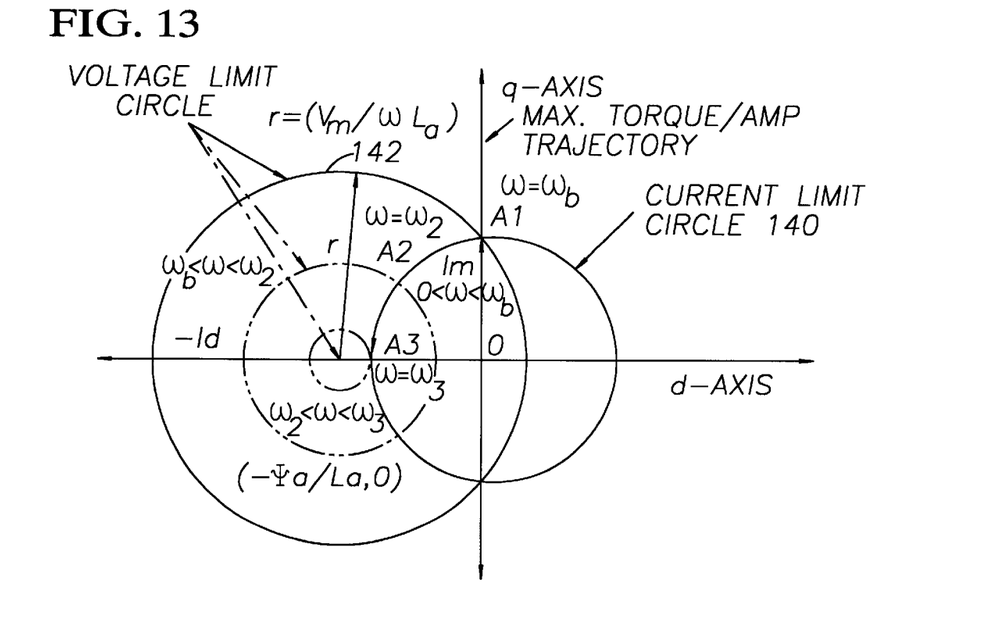
FIG. 13 is a plot of voltage and current on the d-q reference frame in accordance with the present invention.

Referring now to FIG. 13, limited current ratings of the inverter power devices are represented in the rotor referenced $I_d$-$I_q$ plane as a maximum current limit circle 140 with radius $I_a=I_m$, centered at (0,0). Since the motor 18 operates in a PWM current control mode, the current regulator can generate any stator phase current, $I_a$, terminating inside the current limit circle. The maximum available inverter voltage, $V_m$, limits the stator phasor of the motor in the $I_d$-$I_q$ plane to another circular locus with a different radius and center, as $$(V_m/T)^2=[(R_f+L_a i_d)^2+(L_a i_q)^2] \qquad \text{Eq. 3.}$$

This equation can be simplified to represent a circle as, $$(V_m/(TL_a))^2=[(R_f/L_a+i_d)^2+(i_q)^2] \qquad \text{Eq. 4.}$$

In the $I_d$-$I_q$ plane the voltage limited current phasor forms a voltage limit circle 142 with center at $(-R_a/L_a,0)$ having a radius $(V_m/TL_a)$. The radius of this circle decreases (as shown by the broken lines) with increasing motor speed and preferred operation is within these two circles 140, 142.

As mentioned hereinbefore, the controller 26 switches to 180° current control mode (i.e., from region I to region II) when the load current exceeds the preset value while the motor 18 is operating in the constant torque regions (I and II). In this mode, the controller 26 sets $I_d$ to zero to maximize the torque per ampere, where the air gap torque is directly proportional to the q-axis current as, $T_e=kR_f i_q$ where, $k=(3/2)P_n$ and $P_n$ is the number of pole pairs. In the constant torque regions, the q-axis current increases linearly from O to A1 (FIG. 12) which corresponds to the maximum torque. As the voltage increases the speed increases until the voltage reaches its maximum value $V_m$ where the speed reaches the no-load value. There the voltage limit circle 142 intersects the current limit circle 140. The nominal no-load speed of the motor 18 is given as:

$$\omega_b = \frac{V_m}{\sqrt{[\psi_f^2 + (L_a I_m)^2]}}, \qquad \text{Eq. 5}$$

where,

Vm=$\sqrt{(2/3)}$(Vdc/$\psi$) for 120° rectangular wave operation (region I),

Vm=Vdc$\sqrt{6}$ for 180° sinusoidal operation (region II) with space vector modulation, and $V_{dc}$=input d.c. voltage.

The maximum torque, $T_m$, is given as $T_m=(3/2) \cdot p_n \cdot R_f \cdot I_m$ (Eq. 6). If the speed of the motor 18 exceeds its base value, the current controller saturates as the back emf approaches the d.c. source voltage. At this point the motor 18 enters into field weakening region (III) for extended speed operation. In the field weakening region, the phase voltage is controlled so as not to exceed the d.c. source voltage at the input of the inverter. This is accomplished through a combination of field weakening, where the air gap flux is reduced by the demagnetizing component of the stator current, and increasing the reactive voltage drop across the winding reactance (hence the requirement for larger phase currents and phase advance angle for a given torque as speed is increased). For example, to maintain a constant power above the base speed, the torque producing component of the stator current, $i_q$ is controlled such as, $i_{qt}=(T_b/T) \cdot I_m$ (Eq. 7). In order to keep the terminal voltage, $V_a$, under the voltage limit, $V_m$, the required d-axis current is, $i_{df}=-[1-(T_b/T)] (R_f/L_a)$ (Eq. 8). The armature current, $I_a$, is limited to $I_m$. As the speed of the motor 18 increases, the operating point moves from A1 to A2 (FIG. 12). The speed of the motor at point A2 is determined by, $$\omega_2 = \frac{\psi_f^2 + (L_a I_m)^2}{\psi_f^2 - (L_a I_m)^2} \qquad \text{Eq. 9}$$

where, $R_f$ should be greater than $L_a I_m$. The speed can be increased further from A2 upto A3, but the output power is reduced to maintain the phase current within the maximum limit and the q-axis command current is reduced at a faster rate. At point A3 the motor 18 operates near zero power factor condition. The maximum no-load speed in the field weakening region without exceeding the voltage and current limits is obtained by setting $i_q=0$ and $V_a=V_m$ and $i_d=I_m$ in Eq. 2 as, $$T_3=[V_m/R_f-L_aI_m)] \qquad \text{Eq. 10.}$$

The required d-axis current to operate the motor 18 at any given speed, ω, in the field weakening region is computed as, $$i_d^*=-(\psi f/La)+(1/La)\sqrt{(Vm/\omega)^2-(LaIq)^2} \qquad \text{Eq. 11.}$$

Figure 14:
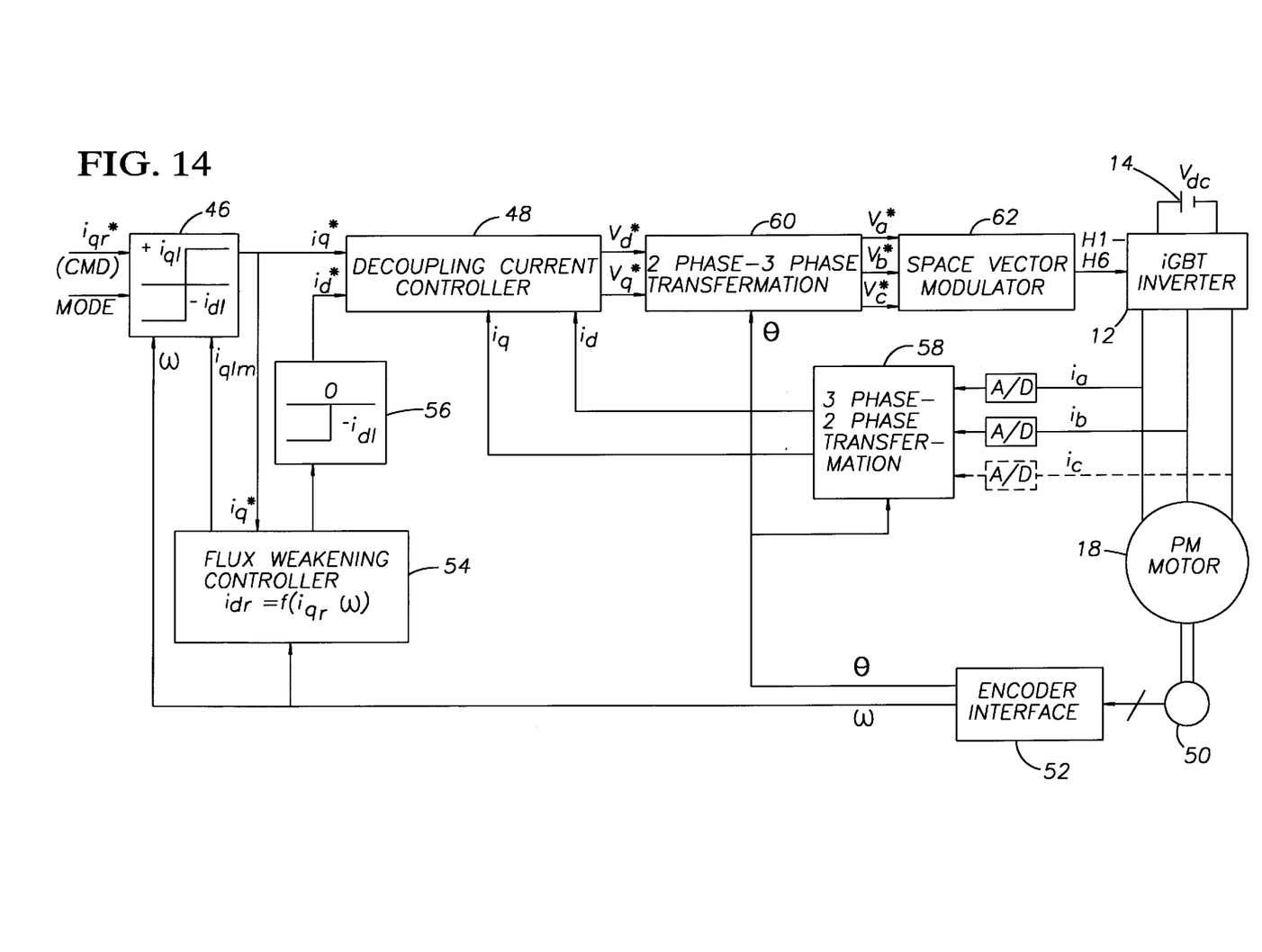
FIG. 14 is a schematic block diagram of the 180° mode current controller portion of the controller of FIG. 8 in accordance with the preferred embodiment of the present invention.

Referring to FIG. 14, a functional block diagram of the 180° mode vector controller portion is shown. Command $i_{qr}^*$ and mode signals are applied to a current command limiter 46. The limiter 46 limits the q-axis command current based on the region (II or III) of operation of the motor 18. If the measured speed T>$T_b$ then $I_{ql}=I_m T_b/T$ else $I_m$. In the regeneration mode the q-axis command current, ($i_{qr}$) is made negative. The command current is passed through the limiter 46 to form q-axis current reference, $I_q^*$ to a decoupling current controller 48.

The motor 18 speed (ω) and phase (θ) are sensed by sensors 50 and encoded by encoder 52 for processing. The encoder 52 is a 10 bit absolute encoder which converts the signals into commutation and quadrature signals through an EPROM having a conversion program (such being readily apparent to one of ordinary skill in the art from the present description). The signals processed by a programmable logic device (PLD) to generate rotor angle (θ) and speed (ω). The speed signal (ω) is provided to the limiter 46 as described above. The speed signal (ω) is applied to a flux weakening controller 54 along with the q-axis current reference ($I_q^*$). A demagnetizing component of the stator current is computed based on the measured speed (ω) and the q-axis current ($I_q^*$) which is passed through a limiter 56 to form the d-axis reference. Modified q-axis current limits are also computed if the stator current exceeds the rated value. If T<$T_b$ then $I_d^*=0$ for the constant torque regions, otherwise $I_d^*$ is computed from Eq. 11 for flux weakening operation above the no-load speed. During flux weakening (when T>$T_b$), if $\sqrt{(Id^{*2}+Iq^{*2})}>I_m$ then, q-axis current limit is adjusted such that the stator phase current does not exceed the rated value, $$Iql=\sqrt{(I^{*2m}-I^{*2d})} \qquad \text{Eq. 12.}$$

The rotor position angle (θ) and measured three-phase current $I_a$, $I_b$ and $I_c$ are provided to a three-phase to two-phase transformer 58 to provide two-phase current signals ($I_d$, $I_q$) according to:

$$Id=Ia\sin(\theta)-1/\sqrt{3}(Ia+2Ib)\cos(\theta) \qquad \text{Eq. 13,}$$

$$Iq=Ia\cos(\theta)+1/\sqrt{3}(Ia+2Ib)\sin(\theta) \qquad \text{Eq. 14}$$

These two-phase signals ($I_d$, $I_q$) are provided to the decoupling current controller 48 where the d and q axes measured and reference currents are compared and processed. The error signals are passed through the P-I controllers to produce corresponding d and q axes voltage references as follows:

$$V_d^*=G_{dc}(S)(I_d^*-I_d) \qquad \text{Eq. 15,}$$

$$V_q^*=G_{qc}(s)(I_q^*-I_q) \qquad \text{Eq. 16,}$$

where, $$G_{dc}=K_{pd}+K_{id}/S \qquad \text{Eq. 17,}$$

$$G_{qc}=K_{pq}+K_{iq}/S \qquad \text{Eq. 18,}$$

$G_{dc}$ and $G_{qc}$ are the proportional gains of the d and q axes P-I controllers, respectively, and $K_{pd}$ and $K_{pq}$ are the integral gains of the d and q axes P-I controllers, respectively.

The two-phase d and q axes voltage references ($V^*_d$, $V^*_q$) and the rotor position angle (θ) are provided to a two-phase to three-phase transformer 60 is to provide three-phase voltage signals ($V^*_a$, $V^*_b$, $V^*_c$) according to, $$V_a^*=V_q^*\cos(2)+V_d^*\sin(2) \qquad \text{Eq. 19,}$$

$$V^*_b=V^*_q[(\sqrt{3}/2)\sin(\theta)-(1/2)\cos(\theta)]-V^*_d[(1/2)\sin(\theta)+\sqrt{3}/2)\cos(\theta)] \qquad \text{Eq.20,}$$

$$V^*_c=V^*_q[(-1/2)\cos(\theta)-(\sqrt{3}/2)\sin(\theta)]+V^*_d[(-1/2)\sin(\theta)+\sqrt{3}/2)\cos(\theta)] \qquad \text{Eq.21.}$$

Figure 15:
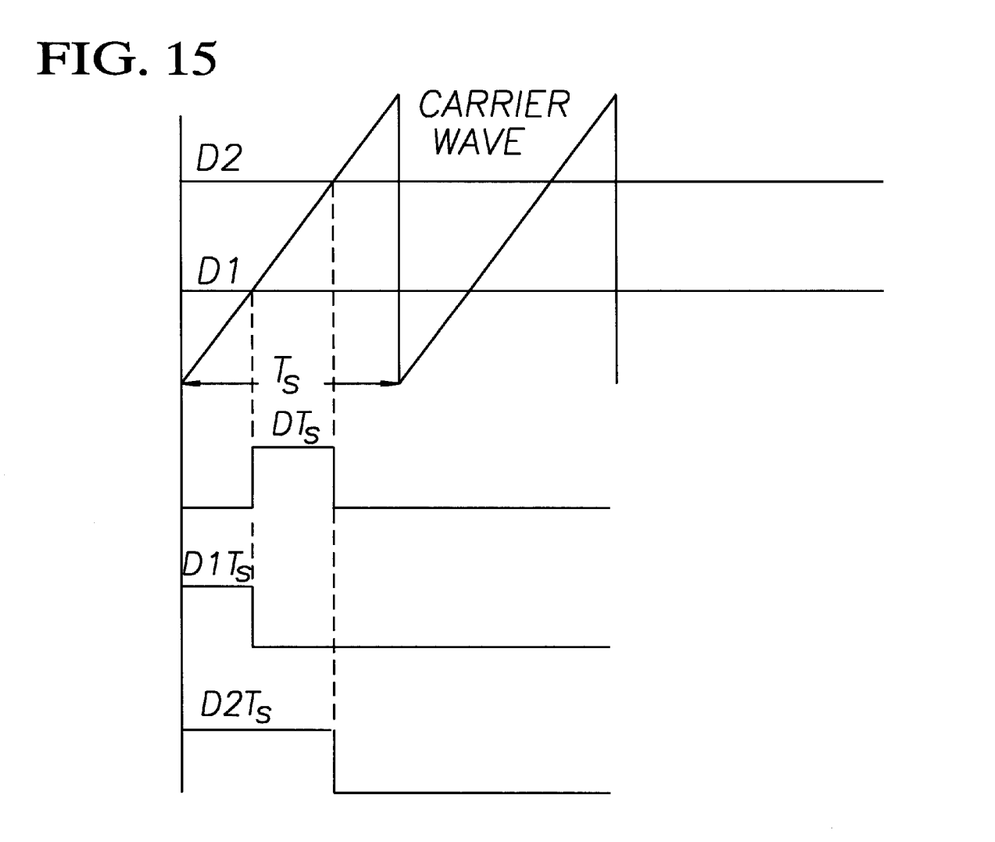
FIG. 15 is a plot of aligned (or synchronized) pulse width modulation pulses with a sawtooth carrier wave in accordance with the present invention.

The three-phase voltage signals ($V^*_a$, $V^*_b$, $V^*_c$) are presented to a space vector modulator 62 where the duty cycles are computed for the IGBTs (S1–S6) of the inverter 12 using a space vector modulation method (see e.g., "Analysis and Realization of a Pulsewidth Modulator Based on Voltage Space Vectors", by H. W. Van Der Broeck et al., IEEE Transaction on Industry and Applications, Vol. 24, No. 1 (1988), which is incorporated herein by reference) with center aligned PWM as shown in FIG. 15 By comparing the three reference voltages ($V^*_a$, $V^*_b$, $V^*_c$) in every 60E interval in a given cycle, the voltage space vectors for all three phases and the respective duty cycles are computed.

Figure 16:
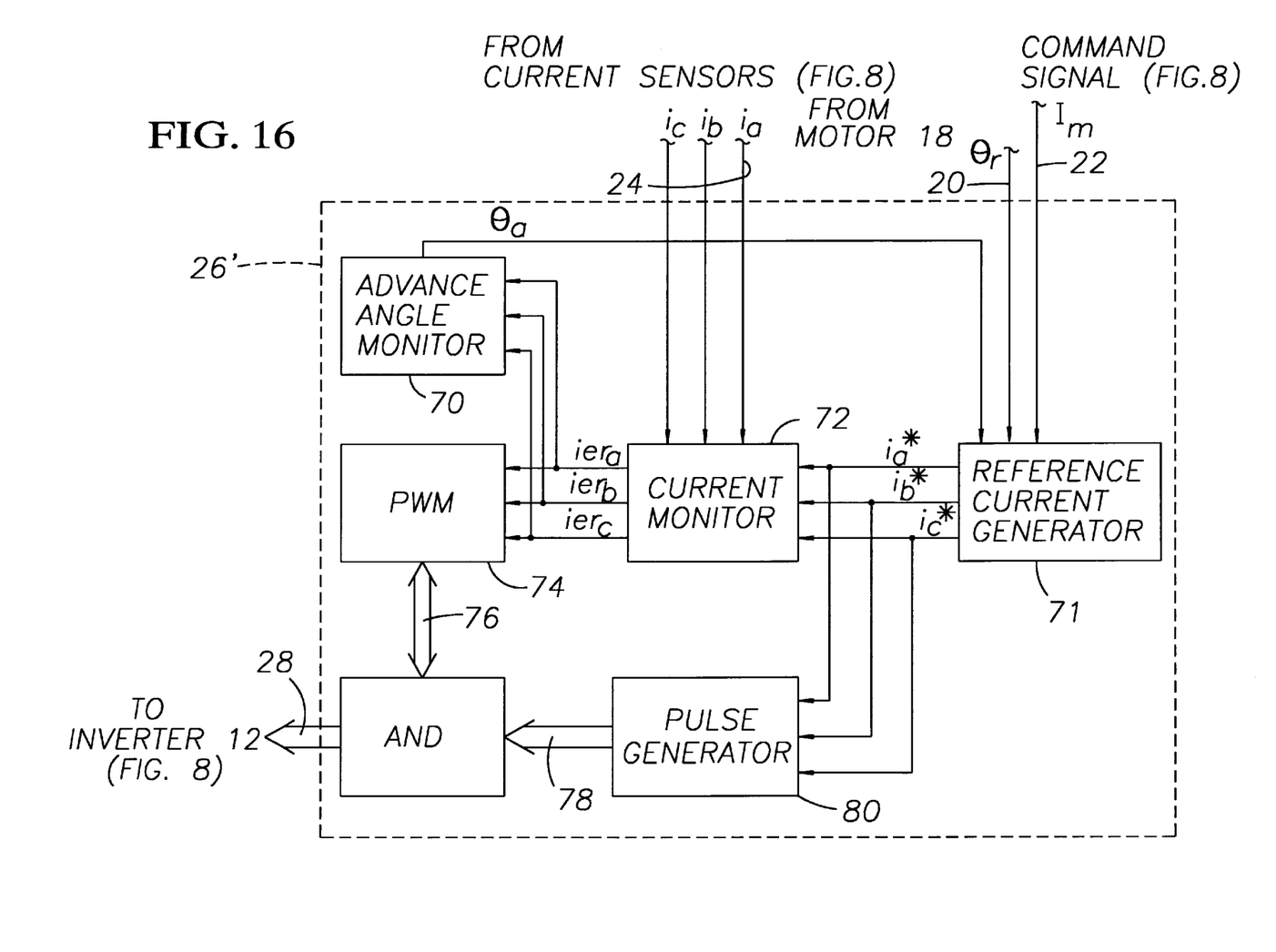
FIG. 16 is a schematic block diagram of the controller of FIG. 8 in accordance with an alternate embodiment of the present invention.

Turning now to an alternate embodiment of the present invention, where controller 26 comprises a controller 26' (FIG. 16) described further hereinafter. In accordance with this alternate embodiment the motor 18 is expressed mathematically as follows, $$V = RI + L\frac{dI}{dt} + E \qquad \text{Eq. 22}$$

where, $$V = [v_a \quad v_b \quad v_c]^t$$

$$I = [i_a \quad i_b \quad i_c]^t$$

$$R = \begin{bmatrix} R_s & 0 & 0 \\ 0 & R_s & 0 \\ 0 & 0 & R_s \end{bmatrix}$$

$$L = \begin{bmatrix} L_s - L_m & 0 & 0 \\ 0 & L_s - L_m & 0 \\ 0 & 0 & L_s - L_m \end{bmatrix}$$

$$E = [e_a \quad e_b \quad e_c],$$

from which the electromagnetic torque, $T_e$, of the motor 18 is obtained as follows:

$$T_e = \frac{p}{2}(e_a i_a + e_b i_b + e_c i_c)/\omega_r, \qquad \text{Eq. 23}$$

where, $R_s$ and $L_s$ are the stator resistance and self inductance, respectively, $L_m$ is the mutual inductance between two phases, p is the number of poles, and $T_r$, is the rotor electric frequency in radians/second of the motor 18. The variables $v_a$, $v_b$, $v_c$, $i_a$, $i_b$, $i_c$ and $e_a$, $e_b$, $e_c$ are the a, b, and c phase voltages, currents and the induced back emfs, respectively of the motor 18. The motor stator phase induced back emfs are obtained by using the finite element approach under the motor no-load operating condition. These values are given as constant parameters for various operating conditions. Since the motor 18 has trapezoidal emf waveforms, a Fourier series can be used. It will be appreciated that saturation and saliency effects are neglected. The motor stator winding inductances are assumed constant despite of the variations of stator currents or saliency effects.

The speed is computed from the acceleration torque equation using the load torque, $T_l$, moment of inertia, J, and the viscous friction coefficient, D:

$$J\frac{d\omega_r}{dt} + D\omega_r = \frac{p}{2}(T_e - T_l). \qquad \text{Eq. 24}$$

The motor rotor position can be expressed as $2_r = T_r t$.

In the no-flux weakening region (I), and for any rotor position $2_r$ the current is generally rectangular (FIG. 5) and the current commands $i^*_a$, $i^*_b$ and $i^*_c$ from a reference current generator 30 in the controller 26 are as follows:

$$i^*_a = \begin{cases} I_m & \text{if } \sin\theta_r > \sin\frac{\pi}{6} \\ -I_m & \text{if } \sin\theta_r < -\sin\frac{\pi}{6}, \\ 0 & \text{otherwise} \end{cases} \qquad \text{Eq. 25}$$

$$i^*_b = \begin{cases} I_m & \text{if } \sin\left(\theta_r - \frac{2\pi}{3}\right) > \sin\frac{\pi}{6} \\ -I_m & \text{if } \sin\left(\theta_r - \frac{2\pi}{3}\right) < -\sin\frac{\pi}{6}, \\ 0 & \text{otherwise} \end{cases} \qquad \text{Eq. 26}$$

$$i^*_c = \begin{cases} I_m & \text{if } \sin\left(\theta_r - \frac{4\pi}{3}\right) > \sin\frac{\pi}{6} \\ -I_m & \text{if } \sin\left(\theta_r - \frac{4\pi}{3}\right) < -\sin\frac{\pi}{6}. \\ 0 & \text{otherwise} \end{cases} \qquad \text{Eq. 27}$$

Figure 6:
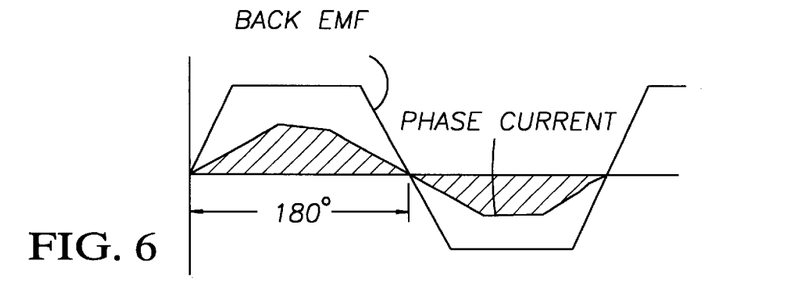
FIG. 6 is a plot of phase current in relation to back emf of the permanent magnet motor in the second region of control of the three region control strategy of the present invention.
Figure 7:
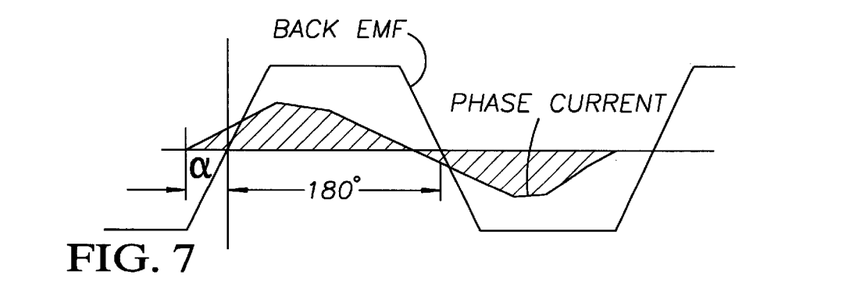
FIG. 7 is a plot of phase current in relation to back emf of the permanent magnet motor in the third region of control of the three region control strategy of the present invention.

In the no-flux weakening region (II) and the flux weakening region (III), the stator currents are sinusoidal (FIGS. 6 and 7, respectfully) to reduce harmonic losses. Those currents are expressed by:

$$i^*_a = I_m \sin(\theta r + \theta a) \qquad \text{Eq. 28,}$$

$$i^*_b = I_m \sin(\theta r + \theta a - 2\pi/3) \qquad \text{Eq. 29,}$$

$$i^*_c = I_m \sin(\theta r + \theta a - 4\pi/3) \qquad \text{Eq. 30,}$$

where, $I_m$, is the amplitude of the command phase currents and $2_a$, is the phase advance angle (the phase advance angle has also been referred to herein as α), as described hereinafter. In region II the phase advance angle $\theta_a$ is set to zero. However, in region III flux weakening is utilized to extend the speed range, with the phase angle being advanced as described herein. Current ramping is introduced in the phase command currents to allow for a system time constant and to ensure a smooth transition with no loss of control from one operating condition to another. That is, the magnitudes of the phase current commands are not allowed to change abruptly as step functions, instead, the magnitudes vary from one operating condition to another following ramp functions. Therefore, for the magnitude of the current command at a first operating condition, $I_{m1}$, to change to the magnitude at a second operating condition, $I_{m2}$, the equation for the magnitude of current command, $I_m$, during the transition can be expressed as follows:

$$I_m = I_{m1} + |RA|\frac{I_{m2} - I_{m1}}{|I_{m2} - I_{m1}|}(t - t_1) \text{ and } I_m < I_{m2}, \qquad \text{Eq. 31}$$

where, $t_1$ is the time instant where the first operating condition ends and RA is the current rate of change.

As described hereinbefore, flux weakening for the extended speed operation (region III) is achieved by phase advancing the current with respect to the motor stator trapezoidal back emf of the motor. The phase advance angle, $2_a$ generated by an advance angle monitor (controller) 70 (FIG. 16) in the controller 26', is given as an input in conjunction with the rotor position angle $2_r$, and the magnitude, $I_m$, of the motor stator phase currents to a reference current generator 71 for generating the command phase currents $i_a^*$, $i_b^*$ and $i_c^*$ of the motor 18, as given in the above Eqs. 28–30.

The stator three phase current error signals $ier_a$, $ier_b$ and $ier_c$ are determined by a current monitor 72 of the current controller 26' as follows:

$$iera = kp(|i^*_a| - |ia|) + ki\int (|i^*_a| - |ia|)dt \qquad \text{Eq. 32,}$$

$$ierb = kp(|i^*_b| - |ib|) + ki\int (|i^*_b| - |ib|)dt \qquad \text{Eq. 33,}$$

$$ierc = kp(|i^*_c| - |ic|) + ki\int (|i^*_c| - |ic|)dt \qquad \text{Eq. 34,}$$

where, $ier_a$, $ier_b$ and $ier_c$ are the current errors for motor stator phase a, b and c, respectively, while, $k_p$ and $k_i$ are the proportional and integral gain constants of the current monitor 72, respectively. The current error signals ($ier_a$, $ier_b$, $ier_c$) are input to a 20 k Hz. pulse width modulation (PWM) current controller 74 whose outputs 76 and combined with switch enable signals 78 from pulse generator 80 to generate pulse sequences H1–H6, 28, for control of inverter 12 gates SI–S6, respectively.

The motor stator phase currents ($i_a$, $i_b$, $i_c$) are modulated and follow the command phase currents ($i_a^*$, $i_b^*$, $i_c^*$). It will be appreciated that the bipolar carrier waveforms are used and the absolute values of the command currents as well as of the actual currents are individually taken before current error calculations are performed as in Eqs. 32–34, whereby synchronism between the phases conducting currents in the no-flux weakening regions (I and II) are ensured.

The step load can be characterized by $T_1(t) = Au(t)$ where, u(t) is a unit step function. The total torque that balances the motor electromagnetic torque $T_e$ is expressed as $T = DT_m + T_1$, where $T_m$ is the motor mechanical speed in radians/second and the viscous friction coefficient D is assumed in the present example.

Figures 17A, 17B:
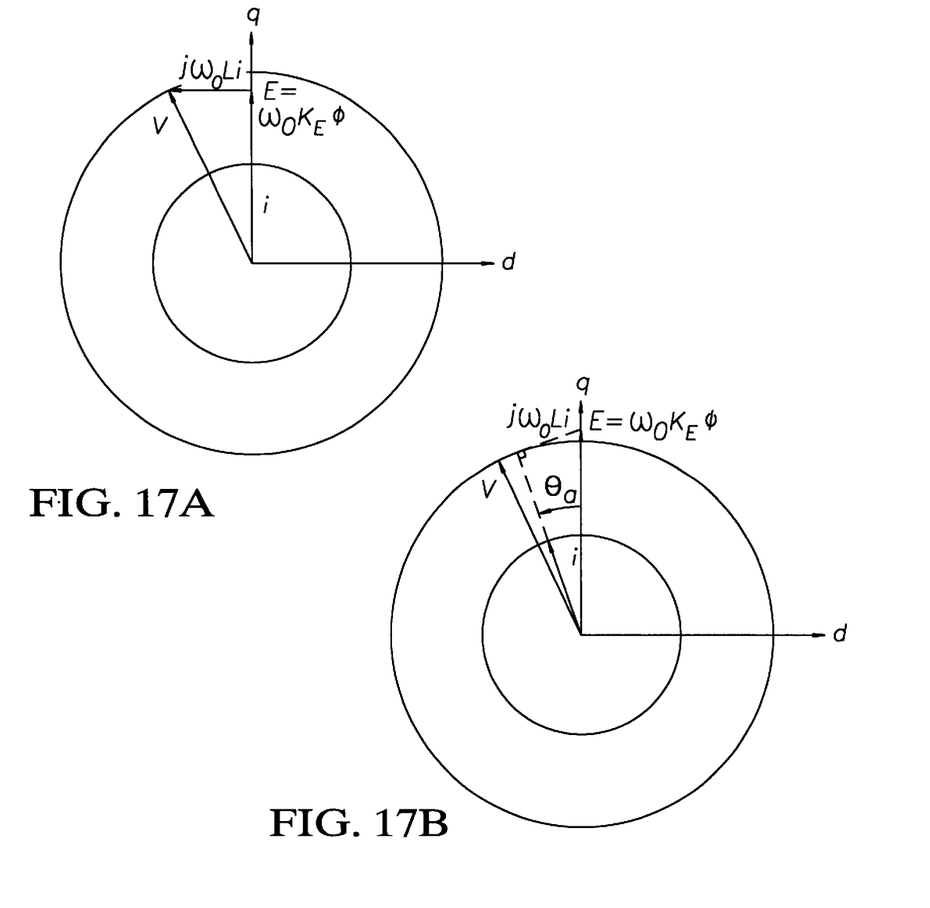
Figure 17C:
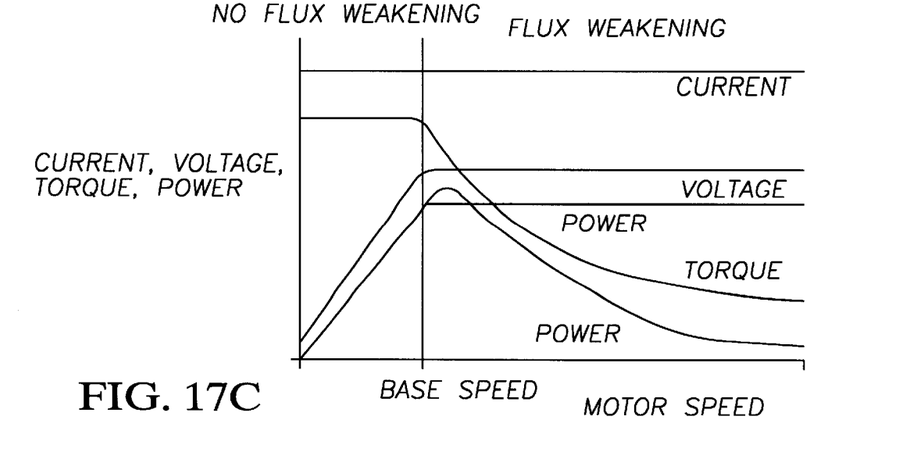
FIG. 17C is a plot of current, voltage, torque, power and speed for the permanent magnet motor of the present invention.

Referring to FIG. 17A, the torque in the motor 18 is proportional to the product of excitation magnet flux $M_m$, phase current, I and sine of the angle between $M_m$ and I. The motor 18 produces constant maximum torque at a given current level when the current vector is aligned with the back emf vector which is proportional to the constant magnet flux and motor speed (FIG. 17C). As the motor speed is increased the stator phase voltages and power are increased as well while the phase currents and torque remain constant (FIG. 17C). This results in growing stator phase voltages and power in proportion to speed. Also, the constant magnetization flux vector is 90° apart from the phase current vector. This results in the maximum power growing in proportion to speed, and the same is valid for the phase voltage. When the motor induced voltage approaches the fixed supplied source voltage, the driving voltage necessary to maintain the same phase currents decays, and so does the generated torque, which limits the speed range. Flux weakening extends the motor speed range while maintaining a reasonable inverter rating and high torque/ampere ratio. Accordingly, the motor 18 is operated in a no flux weakening regions where the stator phase currents are regulated by the pulse width modulator controller 74 to follow the command (reference) currents closely.

When the motor phase voltage approaches the fixed d.c. voltage (i.e., the source (the battery 14) voltage) as the speed is increased, the driving voltage (vector difference between the phase voltage and induced phase voltage or back emf, FIG. 17C) necessary to keep the same phase current decays because the back emf is increasing while the phase voltages need to be limited at the battery voltage level. Under these conditions flux weakening is used to extend the motor speed range while keeping the phase currents at the same level. In a preferred embodiment, flux weakening is accomplished by using the stator current components to counter the fixed-amplitude magnetic airgap flux generated by the rotor magnets (FIG. 17A) with the phase current vector leading the back emf vector by the phase advance angle $2_a$. The maximum torque is preferably reduced above the speed where flux weakening starts (FIG. 17C), since part of the current, $I_m \sin 2_a$, is used for flux weakening instead of torque production (FIG. 17B). In the flux weakening region (III) the stator phase voltages are limited at the fixed d.c.voltage level of the battery 14 to fully utilize the capability of the battery source and minimize the phase currents, to reduce ohmic losses due to the armature resistances and commutation losses. It will be appreciated that in FIGS. 17A–C the motor stator armature resistance voltage drops are neglected.

Figure 18:
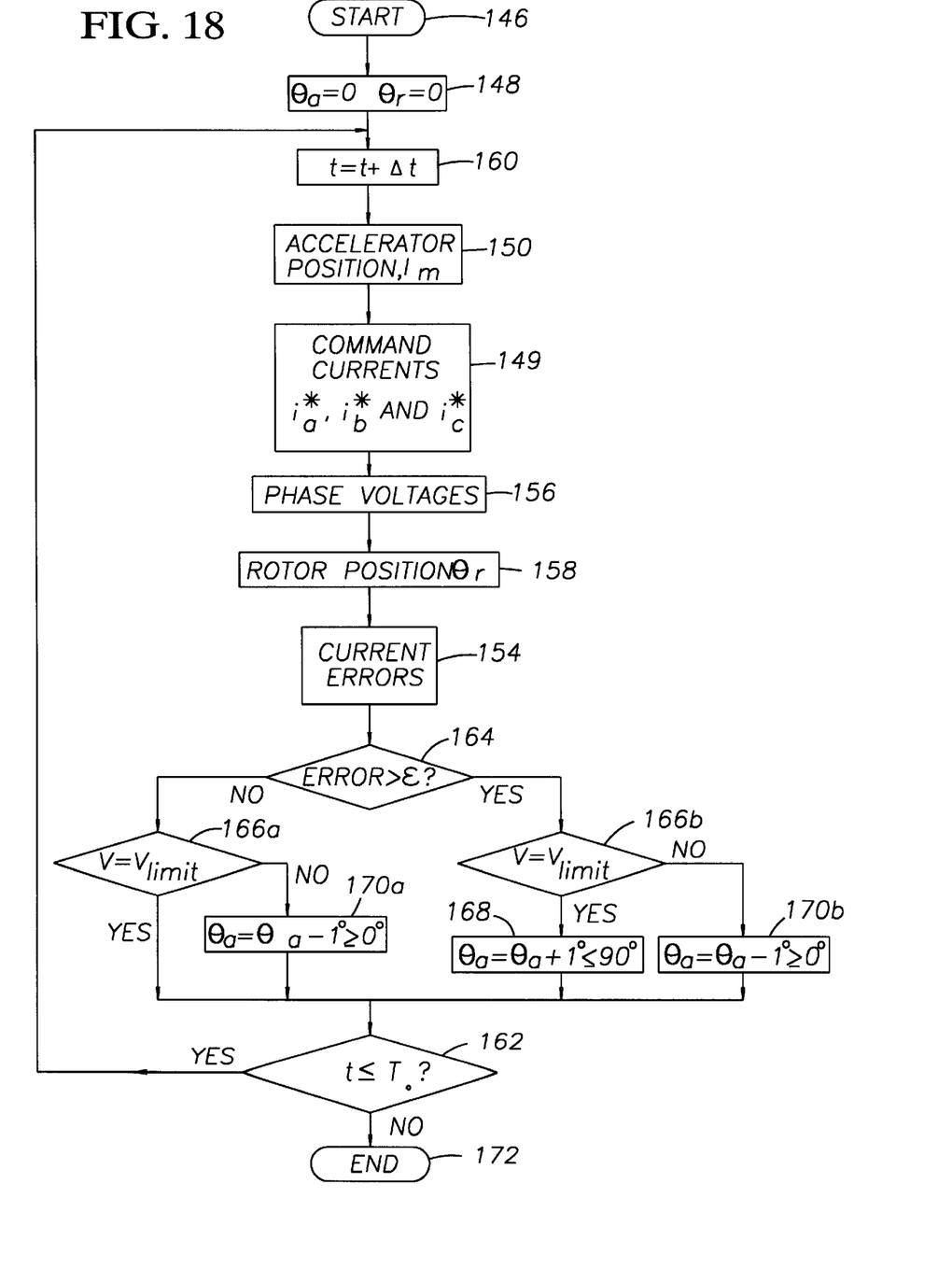
FIG. 18 is a flow chart of the control algorithm of the alternate embodiment of the present invention.

Referring to FIG. 18, a flow chart for a phase current control algorithm in accordance with the present invention is generally shown. As the load condition and/or command (reference) phase currents change the motor 18 operating condition changes accordingly from one point to another. This process is initiated at block 146 and immediately proceeds to block 148 where $\theta_r$ and $\theta_a$ are first initialized to zero. The command phase currents (block 149) are formed based on the knowledge of the magnitude $I_m$ (block 150), which is provided, e.g., an accelerator pedal in an electric vehicle, rotor position angle $2_r$, and advance angle $2_a$ (block 152). The phase current errors (block 154), phase voltage V (block 156), and the rotor position angle $2_r$ (block 158), are determined. The time interval (t) is incremented by $\Delta t$ at every cycle (block 160), as maintained by a running timer (e.g., the system clock). Each phase current error is then divided by the command phase current at the same time instant to obtain the relative phase current error and is compared with a preset threshold 0 (block 164).

Figure 19:
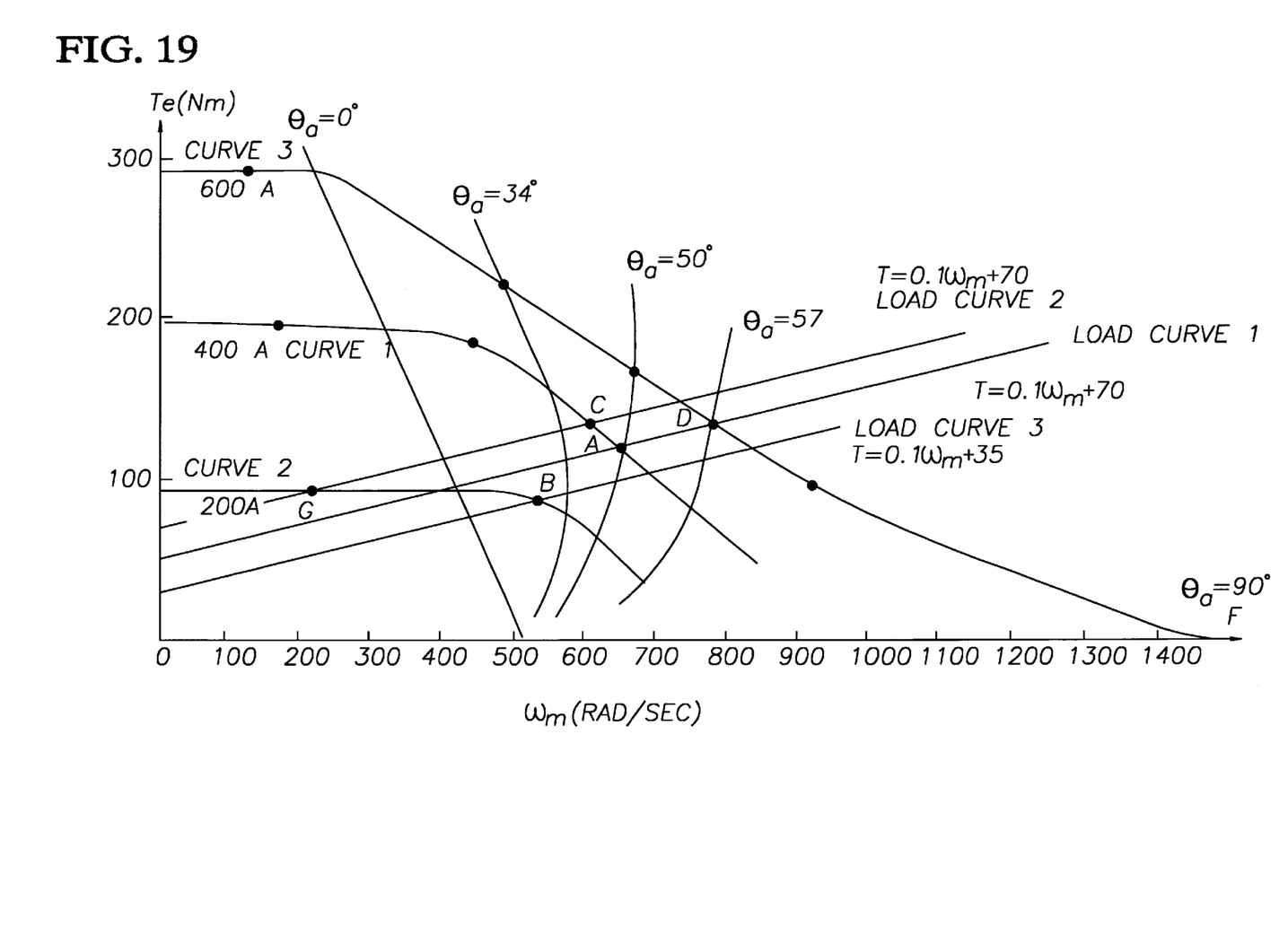
FIG. 19 is a further exemplary plot of torque versus speed for the permanent magnet motor of the present invention.

If the current relative error is within the range of ±0, then the phase currents follow the command currents closely. In the meantime, check (block 166a) if the phase voltage V is at the saturated level which is the battery limit, $V_{limit}$ (voltage constraint). If V is at the saturated level continue to block 162 to determine if the preset time limit (T) has expired. If the phase voltage V is below the saturated level (block 170a) and the phase advance angle $2_a$=0, the motor is operated in noflux weakening regions, continue until it reaches the steady-state operating point, such as Point G, (intersection of Curve 2 and Load Curve 2 in FIG. 19). If V is below the saturated level and the phase advance angle $2_a$>0, the motor is operated in flux weakening regions, $2_a$ should be decreased by 1E at each time instant (cycle) until V saturates, such as from Point A to C in FIG. 19.

If the current relative error is greater than the tolerance (0), it means that the phase current control is lost. Again, check if the phase voltage V (block 166b) is at the saturated level. If V is at the saturated level (block 170b) increase the phase advance angle $2_a$, by 1° (up to 90E) at each time instant until the current control is regained, i.e., current relative error is within ±0, such as from Point A to D in FIG. 19. If the phase voltage V is below the saturated level (block 168) decrease the phase advance angle $2_a$, by 1° at each time instant (cycle) until V saturates, such as from Point A to B in FIG. 19. Once the time limit T has expired the process ends at block 172.

In order to stop the motor 18, a zero phase current magnitude is commanded following a ramp function. The phase currents will flow back to the battery source 14 through the diode circuit of the inverter 12, whereby the torque becomes negative with power stored in the motor 18 being pumped or recharged back to the battery source 14. The motor 18 is then in a regeneration or braking mode. During regeneration the phase voltages will reach a saturated level. As the phase currents die out to zero the back emf, phase voltage, and motor speed, are decreased until the motor 18 stops.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method of controlling operation of a permanent magnet motor, comprising:

selecting a mode of operation from first, second and third modes of operation based on at least one of a signal indicative of a parameter of the motor and a command signal wherein the first and second modes of operation are constant torque modes and the third mode of operation is a field weakening mode;

applying to the motor, phase currents which are substantially in phase with corresponding electromotive forces of the motor when the first mode of operation is selected;

applying to the motor, phase currents which are substantially sinusoidal and are substantially in phase with corresponding electromotive forces of the motor when the second mode of operation is selected wherein the second mode of operation is selected from the first mode of operation when a load current exceeds a preset value; and applying to the motor, phase currents which are substantially out of phase with corresponding electromotive forces of the motor when the third mode of operation is selected;

wherein the said permanent magnet motor comprises a permanent magnet brushless direct current motor having a trapezoidal distribution of magnetic field in an airgap thereof.

2. The method of claim 1 wherein the phase currents which are generally out of phase with corresponding electromotive forces of the motor comprise sinusoidal phase currents which are substantially out of phase with corresponding electromotive forces of the motor.

3. The method of claim 1 wherein the permanent magnet motor comprises a permanent magnet brushless direct current motor having a trapezoidal distribution of magnetic field in an airgap thereof.

4. The method of claim 1 wherein:

the phase currents which are substantially in phase with corresponding electromotive forces of the motor when the first mode of operation is selected comprise essentially 120° phase currents;

the phase currents which are substantially sinusoidal and are substantially in phase with corresponding electromotive forces of the motor when the second mode of operation is selected comprise essentially 180° sinusoidal phase currents; and the phase currents which are substantially out of phase with corresponding electromotive forces of the motor when the third mode of operation is selected comprise essentially 180° phase currents.

5. The method of claim 1 further comprising:

generating the phase currents which are substantially out of phase with corresponding electromotive forces of the motor when the third mode of operation is selected utilizing flux weakening.

6. The method of claim 5 wherein the utilization of flux weakening includes varying a phase advance angle of the phase currents until a desired operating condition is obtained.

7. The method of claim 6 wherein the varying the phase angle comprises incrementing the phase angle in essentially 1° increments.

8. The method of claim 6 wherein the varying the phase angle comprises varying the phase angle up to a phase angle of essentially 90°.

9. A method of controlling operation of a permanent magnet motor, comprising:

applying to the motor, phase currents which are substantially in phase with corresponding electromotive forces of the motor when a first mode of operation is selected;

applying to the motor, phase currents which are substantially in phase with corresponding electromotive forces of the motor and substantially sinusoidal when a second mode of operation is selected;

selecting from said first mode of operation and said second mode of operation based on at least one of a signal indicative of a parameter of the motor and a command signal wherein the first and second modes of operation are constant torque modes, and wherein the second mode of operation is selected from the first mode of operation when a load current exceeds a preset value; and wherein said permanent magnet motor comprises a permanent magnet brushless direct current motor having a trapezoidal distribution of magnetic field in an airgap thereof.

10. The method of claim 9 wherein the phase currents of said second mode of operation which are substantially sinusoidal comprise sinusoidal phase currents.

11. The method of claim 9 wherein the phase currents of said first mode of operation are substantially rectangular phase currents.

12. The method of claim 9 wherein the permanent magnet motor comprises a permanent magnet brushless direct current motor having a trapezoidal distribution of magnetic field in an airgap thereof.

13. The method of claim 9 wherein:

the phase currents of the first mode of operation comprise essentially 120° phase currents; and the phase currents of the second mode of operation comprise essentially 180° phase currents.

14. The method of claim 9 further comprising:

generating the phase currents which are substantially out of phase with corresponding electromotive forces of the motor when a third mode of operation is selected utilizing flux weakening.

15. The method of claim 14 wherein the utilization of flux weakening includes varying a phase advance angle of the phase currents until a desired operating condition is obtained.

16. The method of claim 15 wherein the varying the phase angle comprises incrementing the phase angle in essentially 1° increments.

17. The method of claim 15 wherein the varying the phase angle comprises varying the phase angle up to a phase angle of essentially 90°.

18. A permansent magnet motor control system for an electric vehicle, comprising:

a permanent magnet motor associated with the electric vehicle;

a battery associated with the electric vehicle;

an inverter receptive to direct current signals from the battery for providing phase currents to the motor; and a controller for selecting a mode of operation from first, second and third modes of operation, wherein the first and second modes of operation are constant torque modes and the third mode of operation is a field weakening mode, and for producing control signals, based on at least one of a signal indicative of a parameter of the motor and a command signal, the inverter in response to the control signals providing phase currents which are substantially in phase with corresponding electromotive forces of the motor when the first mode of operation is selected, are sinusoidal and substantially in phase with corresponding electromotive forces of the motor when the second mode of operation is selected wherein the second mode of operation is selected from the first mode of operation when a load current exceeds a preset value, and are substantially out of phase with corresponding electromotive forces of the motor when the third mode of operation is selected;

wherein said permanent magnet motor comprises a permanent magnet brushless direct current motor having a trapezoidal distribution of magnetic field in an airgap thereof.

19. The system of claim 18 wherein the phase currents which are substantially out of phase with corresponding electromotive forces of the motor comprise sinusoidal phase currents which are substantially out of phase with corresponding electromotive forces of the motor.

20. The system of claim 18 wherein the permanent magnet motor comprises a permanent magnet brushless direct current motor having a trapezoidal distribution of magnetic field in an airgap thereof.

21. The system of claim 18 wherein:

the phase currents which are substantially in phase with corresponding electromotive forces of the motor when the first mode of operation is selected comprise essentially 120° phase currents;

the phase currents which are substantially sinusoidal and are substantially in phase with corresponding electromotive forces of the motor when the second mode of operation is selected comprise essentially 180° sinusoidal phase currents; and the phase currents which are substantially out of phase with corresponding electromotive forces of the motor when the third mode of operation is selected comprise essentially 180° phase currents.

22. The system of claim 18 wherein the controller further includes:

a phase advance angle controller to vary a phase advance angle of the phase currents in the third mode of operation.

23. The system of claim 22 wherein the phase angle is varied in essentially 1° increments.

24. The system of claim 22 wherein the phase angle is varied up to a phase angle of essentially 90°.

25. The system of claim 18 wherein said controller comprises:

a signal processor responsive to at least one of the signals indicative of the parameter of the motor and the command signal, and having a memory for storing signals including signals defining and executable algorithm for selecting the mode of operation and the producing the control signals.

26. A permanent magnet motor control system for an electric vehicle, comprising:

a permanent magnet motor associated with the electric vehicle;

a battery associated with the electric vehicle;

a controller for selecting a mode of operation from a first mode of operation and a second mode of operation, the first and second modes of operation being constant torque modes, said controller producing control signals based on at least one of a signal indicative of a parameter of the motor and a command signal; and an inverter receptive to direct current signals from the battery for providing phase currents to the motor, said inverter, in response to the control signals, providing phase currents which are substantially in phase with corresponding electromotive forces of the motor when the first mode of operation is selected and are substantially sinusoidal and substantially in phase with corresponding electromotive forces of the motor when the second mode of operation is selected, wherein the second mode of operation is selected from the first mode of operation when a load current exceeds a preset value; and wherein said permanent magnet motor comprises a permanent magnet brushless direct current motor having a trapezoidal distribution of magnetic field in an airgap thereof.

27. The system of claim 26 wherein the phase currents of said second mode of operation which are substantially sinusoidal comprise sinusoidal phase currents.

28. The system of claim 26 wherein the phase currents of said first mode of operation are substantially rectangular phase currents.

29. The system of claim 26 wherein the permanent magnet motor comprises a permanent magnet brushless direct current motor having a trapezoidal distribution of magnetic field in an airgap thereof.

30. The system of claim 26 wherein:

the phase currents of the first mode of operation comprise essentially 120° phase currents; and the phase currents of the second mode of operation comprise essentially 180° phase currents.

31. The system of claim 26 wherein the controller further includes:

a phase advance angle controller to vary a phase advance angle of the phase currents in a third mode of operation.

32. The system of claim 31 wherein the phase angle is varied in essentially 1° increments.

33. The system of claim 31 wherein the phase angle is varied up to a phase angle of essentially 90°.

34. The method of claim 1 wherein selecting the second mode of operation from the first mode of operation avoids substantially demagnetizing magnets on the motor.

35. The method of claim 9 wherein selecting the second mode of operation from the first mode of operation avoids substantially demagnetizing magnets on the motor.

36. The system of claim 18 wherein selecting the second mode of operation from the first mode of operation avoids substantially demagnetizing magnets on the motor.

37. The system of claim 26 wherein selecting the second mode of operation from the first mode of operation avoids substantially demagnetizing magnets on the motor.

* * * * *